United States Patent
Yu et al.

(10) Patent No.: US 9,712,273 B2
(45) Date of Patent: Jul. 18, 2017

(54) ORBITAL ANGULAR MOMENTUM MULTIPLEXING FOR DIGITAL COMMUNICATION

(71) Applicant: ZTE Corporation, Shenzhen (CN)

(72) Inventors: Jianjun Yu, Basking Ridge, NJ (US); Yuan Fang, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 91 days.

(21) Appl. No.: 14/710,366

(22) Filed: May 12, 2015

(65) Prior Publication Data

US 2015/0333865 A1 Nov. 19, 2015

Related U.S. Application Data

(60) Provisional application No. 61/992,824, filed on May 13, 2014.

(51) Int. Cl.
| | |
|---|---|
| *H04J 14/00* | (2006.01) |
| *H04J 14/04* | (2006.01) |
| *H04B 10/516* | (2013.01) |
| *H04B 10/60* | (2013.01) |
| *H04B 10/11* | (2013.01) |

(52) U.S. Cl.
CPC ........... *H04J 14/00* (2013.01); *H04B 10/11* (2013.01); *H04B 10/5161* (2013.01); *H04B 10/60* (2013.01); *H04J 14/04* (2013.01)

(58) Field of Classification Search
CPC ...... H04B 10/5161; H04B 10/60; H04J 14/04
See application file for complete search history.

(56) References Cited

U.S. PATENT DOCUMENTS

| | | | |
|---|---|---|---|
| 9,077,577 B1* | 7/2015 | Ashrafi | H04L 27/362 |
| 2013/0148963 A1* | 6/2013 | Cvijetic | H04J 14/04 |
| | | | 398/45 |
| 2015/0104139 A1* | 4/2015 | Brunet | G02B 6/03611 |
| | | | 385/124 |
| 2015/0146815 A1* | 5/2015 | Berretta | H04L 27/18 |
| | | | 375/279 |
| 2016/0204896 A1 | 7/2016 | Yu et al. | |
| 2016/0212510 A1* | 7/2016 | Bogoni | H04J 14/04 |
| 2016/0254897 A1* | 9/2016 | Berretta | H04L 5/04 |

OTHER PUBLICATIONS

Allen, L., et al., "Orbital angular-momentum of light and the transformation of Laguerre-Gaussian laser modes," Physical Review A, 45(11):8185-8189, Jun. 1992.

(Continued)

*Primary Examiner* — Dzung Tran
(74) *Attorney, Agent, or Firm* — Perkins Coie LLP

(57) ABSTRACT

Optical signals with different orbital angular momentum (OAM) modes are used to multiplex data for different receiver together or a light signal. The OAM based multiplexing may be used in addition to other multiplexing schemes such as time division multiplexing, polarization multiplexing and so on. Capacity of existing optical network infrastructure can be increased significantly using OAM modulation, and data communication can be secured at the same time.

31 Claims, 9 Drawing Sheets

(56) References Cited

OTHER PUBLICATIONS

Djordjevic, I.B., et al., "Error-Correction Coded Orbital-Angular-Momentum Modulation for FSO Channels Affected by Turbulence," Journal of Lightwave Technology, 30(17):2846-2852, Sep. 2012.

Dong, Z., et al., "Ultra-dense WDM-PON delivering carrier-centralized Nyquist-WDM uplink with digital coherent detection," Optics Express, 19(12):11100-11105, Jun. 2011.

Gibson, G., et al., "Free-space information transfer using light beams carrying orbital angular momentum," Optics Express, 12(22):5448-5456, Nov. 2004.

Huang, H., et al., "100 Tbit/s Free-Space Data Link using Orbital Angular Momentum Mode Division Multiplexing Combined with Wavelength Division Multiplexing," Optical Fiber Communication Conference, paper OTh4G.5, pp. 1-3, Anaheim, California, USA, Mar. 2013.

Jack, B., et al., "Angular Diffraction," New Journal of Physics, 10(103013):1-8, Oct. 2008.

Wang, J., et al., "25.6-bit/s/Hz Spectral Efficiency using 16-QAM Signals over Pol-Muxed Multiple Orbital-Angular-Momentum Modes," IEEE Photonics Conference (PHO), pp. 587-588, Arlington, Virginia, USA, Oct. 2011.

Wang, J., et al., "Demonstration of 12.8-bit/s/Hz Spectral Efficiency using 16-QAM Signals over Multiple Orbital-Angular-Momentum Modes," 37th European Conference and Exhibition on Optical Communication (ECOC 2011), We.10.P1.76, pp. 1-3, Geneva, Switzerland, Jul. 2011.

Wang, J., et al., "Terabit free-space data transmission employing orbital angular momentum multiplexing," Nature Photonics, 6(7):488-496, Jun. 2012.

Willner, A.E., "Invited Paper: Orbital Angular Momentum Transmission," 39th European Conference and Exhibition on Optical Communication (ECOC 2013), Mo.4.A.1, pp. 1-3, London, England, Sep. 2013.

Yan, Y., et al., "Multicasting in a spatial division multiplexing system based on optical orbital angular momentum," Optics Letters, 38(19):3930-3933, Oct. 2013.

Yu, J., et al., "Cost-Effective Optical Millimeter Technologies and Field Demonstrations for Very High Throughput Wireless-Over-Fiber Access Systems," Journal of Lightwave Technology, 28(16):2376-2397, Aug. 2010.

Fang, Y., et al., "A Novel PON Architecture Based on OAM Multiplexing for Efficient Bandwidth Utilization," IEEE Photonics Journal, 7(1):7900506(1-6), Feb. 2015.

Fang, Y., et al., "Ultrahigh-capacity access network architecture for mobile data backhaul using integrated W-band wireless and free-space optical links with OAM multiplexing," Optics Letters, 39(14):4168-4171, Jul. 2014.

Huang, H., et al., "100 Tbit/s free-space data link enabled by three-dimensional multiplexing of orbital angular momentum, polarization, and wavelength," Optics Letters, 39(2):197-200, Jan. 2014.

Karimi, E., et al., "Time-division multiplexing of the orbital angular momentum of light," Optics Letters, 37(2):127-129, Jan. 2012.

Wang, J., et al., "N-Dimentional Multiplexing Link with 1.036-Pbit/s Transmission Capacity and 112.6-bit/s/Hz Spectral Efficiency using OFDM-8QAM Signals over 368 WDM Pol-Muxed 26 OAM Modes," 2014 European Conference on Optical Communication (ECOC 2014), Paper Mo.4.5.1, pp. 1-3, Cannes, France, Sep. 2014.

Yue, Y., et al., "1.6-Tbit/s Muxing, Transmission and Demuxing through 1.1-km of Vortex Fiber Carrying 2 OAM Beams Each with 10 Wavelength Channels," Optical Fiber Communication Conference/National Fiber Optic Engineers Conference 2013, OSA Technical Digest (online) (Optical Society of America), Paper OTh4G.2, pp. 1-3, Anaheim, California, USA, Mar. 2013.

\* cited by examiner

ORBITAL ANGULAR MOMENTUM MULTIPLEXING FOR DIGITAL COMMUNICATION

CROSS REFERENCE TO RELATED APPLICATIONS

This patent document claims the benefit of U.S. Provisional Patent Application No. 61/992,824, filed on May 13, 2014. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses, among other things, a passive optical network (PON) access architecture that uses orbital angular momentum (OAM) multiplexing. Using the disclosed techniques, multiple data channels can be multiplexed by orthogonal OAM modes on same wavelength to achieve efficient utilization of bandwidth resources. In one example use, OAM multiplexed data traffic can be provided to multiple user devices in a passive optical network.

In one example aspect, a method of optical communication is disclosed. The method may be implemented at a network-side in an optical communication access network. The method includes transmitting a first data to a first optical receiver using a first orbital angular momentum (OAM) modulation mode, and transmitting a second data, concurrently with transmitting the first data to the first optical receiver, to a second optical receiver using a second OAM modulation mode that is different from the first OAM modulation mode In another example aspect, transmission apparatus operable at a network-side in an optical communication access network is disclosed. The transmission apparatus includes a module to receive a light signal over free space, a module to modulate the light signal to generate a first modulated signal having a first orbital angular momentum (OAM) modulation mode and a second modulated signal having a second OAM modulation mode which differs from the first OAM modulation mode in at least one orthogonal eigenstate of a component of the light signal, and a module to transmit the first modulated signal and the second modulated signal over an optical communication medium.

In yet another example aspect, an optical communication system is disclosed. The system includes an optical transmitter that receives information bits, modulates the information bits onto a light signal to generate a first modulated signal having a first orbital angular momentum (OAM) modulation mode and a second modulated signal having a second OAM modulation mode which differs from the first OAM modulation mode in at least one orthogonal eigenstate of a component of the light signal, and transmits the first modulated signal and the second modulated signal over an optical communication medium. The system also includes a first optical receiver that receives the first modulated signal and recovers information bits from the first modulated signal; and a second optical receiver that receives the second modulated signal and recovers information bits from the second modulated signal.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

The rapidly increasing internet data traffic nowadays has led to increasing demand for higher user access bandwidth. With limited bandwidth currently available for optical access network (e.g., a network connection between user devices in user premises and the network infrastructure), the digital communication industry has been looking for advanced techniques for efficient utilization of available bandwidth resources. Various schemes concerning architecture, modulation format, signal processing and network protocol have been proposed to improve the performance of current passive optical networks.

The present document discloses data communication techniques using orbital angular momentum (OAM), with theoretically infinite orthogonal modes to improve spectral efficiency and transmission capacity, that can be used to address the demand for bandwidth. In one advantageous aspect, OAM based techniques are backward compatible with existing multiplexing techniques such as time division multiplexing (TDM), wavelength division multiplexing (WDM), polarization division multiplexing (PDM), spatial division multiplexing (SDM) and mode division multiplexing (MDM). In another advantageous aspect, the disclosed OAM multiplexing can be used to provide additional degrees of freedom (DOF) for one or more of conventional multiplexing techniques. In another advantageous aspect, the presently disclosed techniques can be implemented in currently deployed optical fiber networks such as PONs, without having to make changes to the already deployed fiber infrastructure.

The present document discloses OAM based data communication techniques and example results obtained in a laboratory test of a PON access architecture based on OAM multiplexing. In the laboratory test, 10 OAM modes with each mode carrying 10 Gbit/s OOK signal, were transmitted over a 0.7 m Free Space Optical (FSO) link. The laboratory test demonstrates that a BER performances of all data channels can be under $3.8 \times 10^{-3}$ enhanced FEC limit in certain embodiments that use the presently disclosed techniques.

Figure 7:
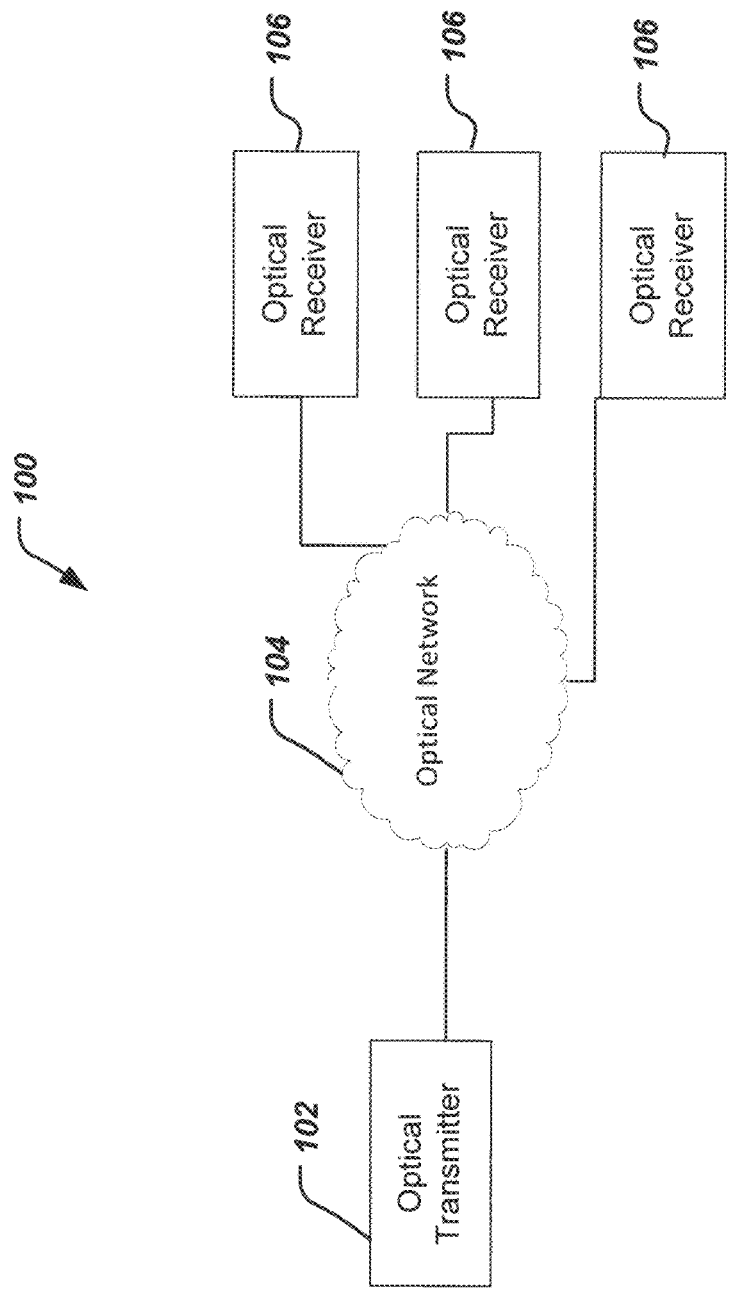
FIG. 7 shows an example of an optical communication network architecture.

FIG. 7 depicts an optical communication system 100 in which the presently disclosed technology can be practiced. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 7 for clarity.

A Laguerre-Gaussian (LG) beam carrying OAM mode features helical phasefront, which can be described by an azimuthal phase term, $e^{(il\phi)}$. The value 1 is known as topological charge which stands for different orthogonal eigenstates corresponding to different OAM modes and $\phi$ is the azimuthal phase. 1 must be an integer ($1=0,\pm 1,\pm 2 \ldots$) to satisfy the self-consistent condition. By employing reflective spatial light modulator (SLM) with pre-calculated hologram pattern, signal can be converted onto specific OAM mode to realize multiplexing or be converted back to fundamental Gaussian beam ($1=0$) to realize demultiplexing.

Figure 1:
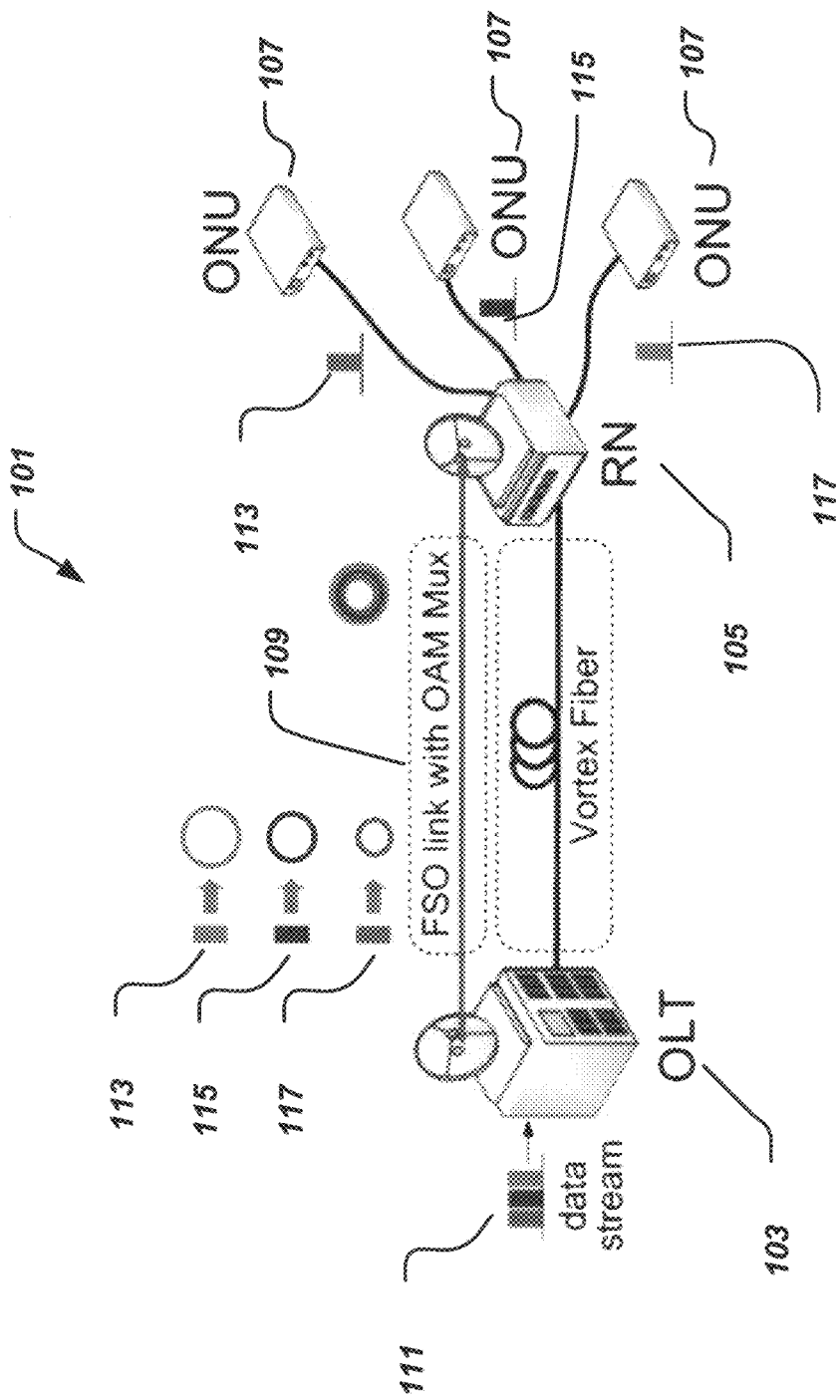
FIG. 1 is a block diagram representation of an example of a passive optical network (PON) that uses orbital angular momentum (OAM) multiplexing.

FIG. 1 illustrates an example PON access network 101 based on OAM multiplexing. The network 101 includes an optical line terminal (OLT) 103, a remote node (RN) 105 and one or more optical network units (ONUs) 107. The link 109 between OLT 103 and RN 105 can be FSO link or vortex fiber that supports OAM transmission. In OLT 103, the data 11 from network is first modulated onto optical carrier. Depending on applications, OLT 103 can either transmit multi-channel data for multiple user access or single channel data for multicasting. FSO link 109 with OAM Mux/Demux can be used to achieve such flexibility of usage.

Multi-channel signals are converted from fundamental Gaussian beam to LG beam with various OAM modes (e.g., modes 113, 115, 117). Benefiting from the orthogonality of OAM modes, signal carried by different OAM modes will not interfere with each other. Meanwhile, multiplexing signals in the dimension of OAM significantly improves spectral efficiency thus enables efficient bandwidth utilization. Moreover, OAM multiplexing provide additional security performance, since a receiver will not be able to demux the OAM mode unless the topological charge is known to the receiver in advance. After FSO transmission, OAM demultiplexing is done in the remote node 105. Every OAM mode can be demultiplexed and detected independently by converting LG beam back to a fundamental Gaussian beam while keeping other modes still in OAM mode. The converted beam is coupled into fiber again and sent to receiver in ONU, as shown by separate carriage of modes 113, 115 and 117 in links between RN 105 and ONUs 107. It will be appreciated that the disclosed architecture is flexible and adaptive to various applications. OAM modes can be utilized to carry different services for multicasting and demultiplexing can also be done at ONU 107.

Multiple OAM modes 113, 115, 117 can be generated in various ways: A specially designed hologram pattern implemented to SLM, odd times reflection, polarization multiplexing in free space and so on. In some embodiments, a hologram pattern is implemented to generate 5 OAM modes.

Figure 2:
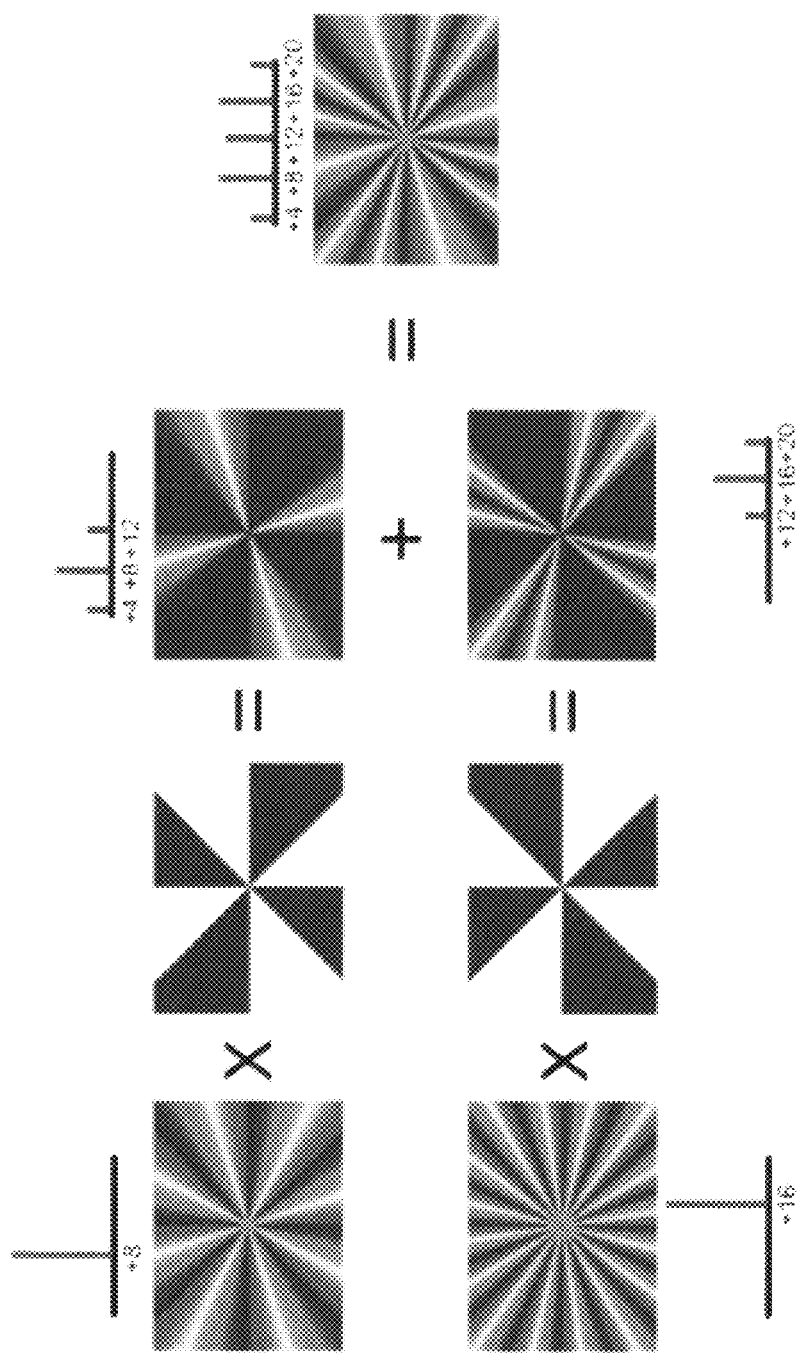
FIG. 2 depicts examples of multiple OAM modes generated based on sliced phase patterns and angular masks.

FIG. 2 shows the process of designing hologram pattern to generate OAM mode +4, +8, +12, +16 and +20 by one SLM simultaneously. In some embodiments, a hologram pattern of +8 and angular mask with 4-fold rotational symmetry can be generated first. Because of the angular diffraction principle, N-fold rotational symmetry angular mask will distribute energy from OAM mode 1 to 1+N and 1−N. Therefore, part of the power on +8 will transfer to +4 and +12. In this way, this hologram pattern generates 3 OAM modes: +4, +8 and +12. Meanwhile, a similar rotational symmetry principle can be used to generate +12, +16 and +20. By superimposition of two hologram patterns, a sliced phase pattern to generate 5 modes is obtained. The angular masks for the two holograms can be designed to be complementary to each other, which minimizes the interference between different modes. Benefiting from the mirror image relationship of reflected LG beam with OAM mode, odd-time reflection can be utilized to generate the OAM modes with opposite charge sign. In this way, 10 OAM modes can be generated with only one SLM, two beam splitters and three mirrors.

Figure 3:
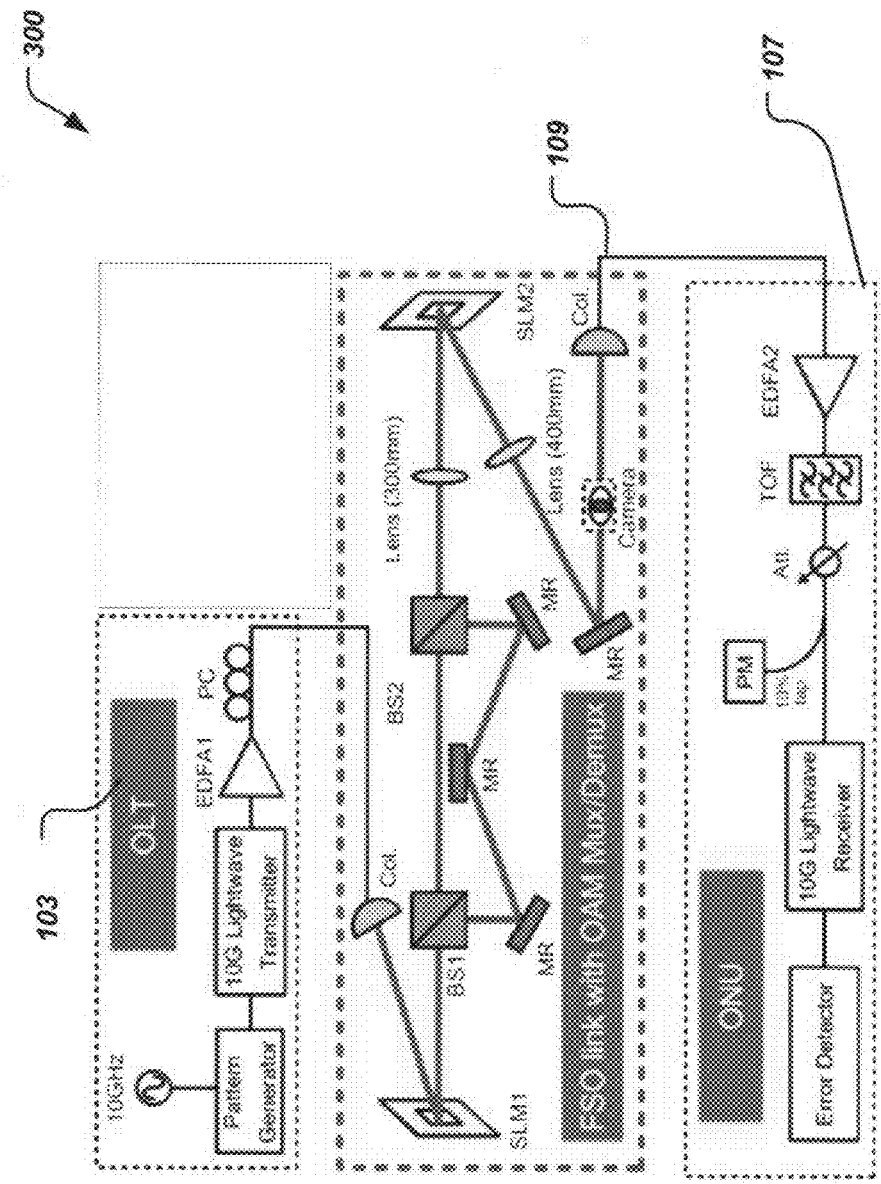
FIG. 3 is a block diagram representation of an end-to-end system in which a transmitter generates an OAM transmission carrying data and a receiver receives the OAM transmission to recover data. Abbreviations used include EDFA: erbium-doped fiber amplifier, PC: polarization controller, SLM: spatial light modulator, Col.: collimator, BS: beam splitter, MR: mirror, TOF: tunable optical filter, Att.: attenuator, PM: power meter.

FIG. 3 depicts an example PON access network 300 based on OAM multiplexing shown in FIG. 2. At the OLT 103, microwave source with 10.665 GHz output is employed as the clock to the pattern generator. Then the electrical signal with pattern length of $2^{31}-1$ is modulated onto optical carrier to generate 10 Gbit/s optical OOK signal at 1550-nm by a 10 G lightwave transmitter (e.g., Agilent 83433A). The Erbium-doped fiber amplifier (EDFA1) is used to provide sufficient optical power up to 22 dBm coupled into FSO link. A polarization controller (PC) is then used horizontally polarize incident light to ensure good performance of the reflective SLM. One of skill in the art will appreciate that while a test signal pattern generator is depicted in FIG. 3, in deployments, network traffic, e.g., user and control data, will be used to modulate the signal transmissions out of the OLT 103.

The optical signal is incident on a liquid-crystal on silicon SLM1 (LCOS-SLM, HAMAMATSU, 792×600 pixels) with high-precision phase modulation characteristics. With a collimator (col.), optical signal is coupled from fiber to FSO link. Utilizing the hologram pattern in FIG. 2, the fundamental Gaussian beam is converted to LG beam with 5 various OAM modes (+4, +8, +12, +16 and +20). After 5 OAM modes are generated by SLM1, the beam is split into two optical paths by BS1. One of the path (the lower path in FIG. 3) contains three additional mirrors to generate OAM modes with opposite sign (−4, −8, −12, −16, −20) through mirror image relationship. Although the 5 OAM modes generated by SLM1 may comprise identical data, the data carried on OAM modes generated by reflection will not be identical with original 5 modes. This results from the different optical path traversed, which decorrelates the data.

The two optical paths are combined by BS2. After a lens to adjust the beam size as well as collimation in the path of light, SLM2 is employed to demultiplex and detect OAM modes. By switching the hologram pattern on SLM2, the specific OAM mode with data can be converted back to the fundamental Gaussian mode. In the setup in FIG. 3, the FSO link between two SLMs is 0.7 m. The beam then goes through another collimator and coupled into fiber again. Here, an infra-red charge-coupled device (IR-CCD) camera is used for the convenience of adjustment and observing optical profile. In actual systems, this camera need not be used. The output of the collimator can then be transmitted to the ONUs.

At ONU, signal first goes through EDFA2 to compensate the loss during coupling and free-space propagation (if FSO is used). A tunable optical filter (TOF) is used to suppress unwanted components. Then the optical signal is input into a 10-G lightwave receiver (e.g., Agilent 83434A) for direct detection. Finally, an error detector is employed to measure the BER performance.

Figure 4:
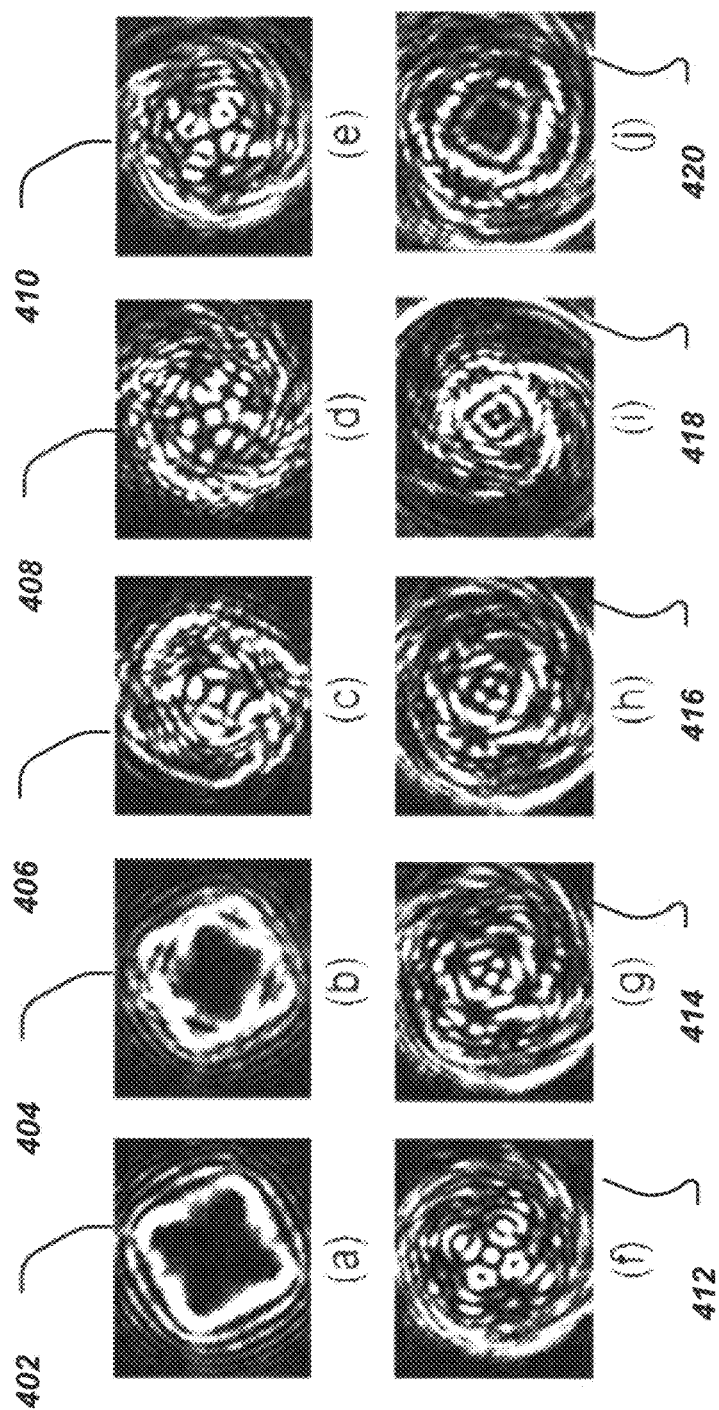
FIG. 4 depicts examples of optical intensity profiles.

FIG. 4 shows example intensity profiles, listed as (a) to (j), that depict the optical intensity profiles for generation and detection of different OAM modes obtained by the infra-red camera in the setup depicted in FIG. 3. The profiles are as follows: (a) 5 OAM modes multiplexing (+4, +8, +12, +16, +20), (b) 10 OAM modes multiplexing (±4, ±8, ±12, ±16, ±20), (c) demux −4, (d) demux +8, (e) demux +10, (f) demux +12, (g) demux +16, (h) demux +18, (i) demux −20, and (j) demux +22.

Profile 402 shows the optical intensity profile of generating 5 OAM modes (+4, +8, +12, +16, +20) by the implementing hologram pattern in FIG. 2 to SLM1. In contrast to the ring intensity profile of a single OAM mode (only one mode), the intensity profile containing 5 OAM modes shows rectangular patterns. Profile 404 shows the optical intensity profile after multiplexing reflection path resulting in a total of 10 OAM modes generated (±4, ±8, ±12, ±16, ±20). The difference in optical path length (the upper and the lower optical paths in FIG. 3) causes different beam size between two "rectangles."

Profiles 404, 406, 408, 410, 412, 414, 416, 418 and 420, respectively show the optical intensity profile of demultiplexing certain OAM mode. For modes −4, +8 +12 +16 and −20, the round point region in the center of the profile indicates that one of the OAM modes has been converted back to fundamental Gaussian mode. However, the imbalance of power distribution on the OAM modes can also be observed. For example, the Gaussian mode in the center after demultiplexing −20 (418) is smaller and darker. For +10, +18 and +22, a dark hole in the center indicates that the multiple OAM modes are comparatively pure (e.g., no interference from other modes). In deployments, the main reasons for impurity of generated OAM modes are typically resolution limitation and imperfection of LCOS-SLM.

Figure 5:
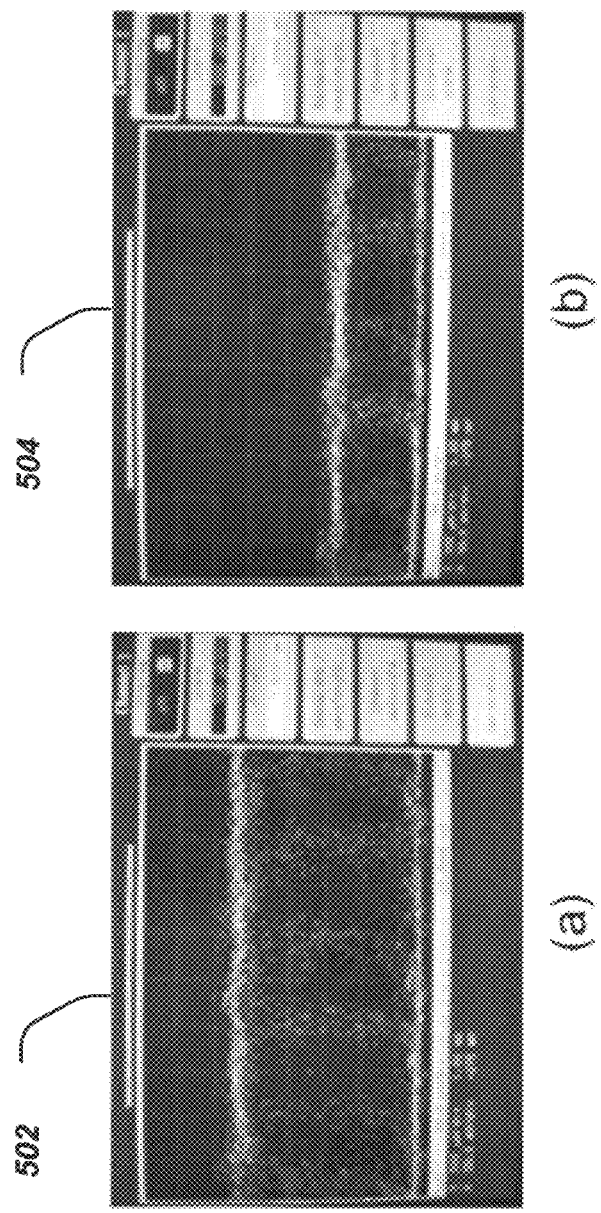
FIG. 5 depicts example eye diagrams of optical On-Off Keying (OOK) signal carried on OAM mode +16 and −20. (50 ps/div, 500 uw/div).

FIG. 5 shows eye diagrams 502, 504 of the 10 Gbit/s OOK signal carried by OAM mode +16 and −20, respectively. The eye diagram is observed under 50 ps/div. In 502, +16 is the OAM mode in the middle of original optical path and the corresponding eye opening degree appears to be relatively good. In 504, −20 OAM mode is depicted by side of the reflection path and the eye opening degree is over 3 dB worse than +16 which correspond with the BER performance measured in FIG. 6.

Figure 6:
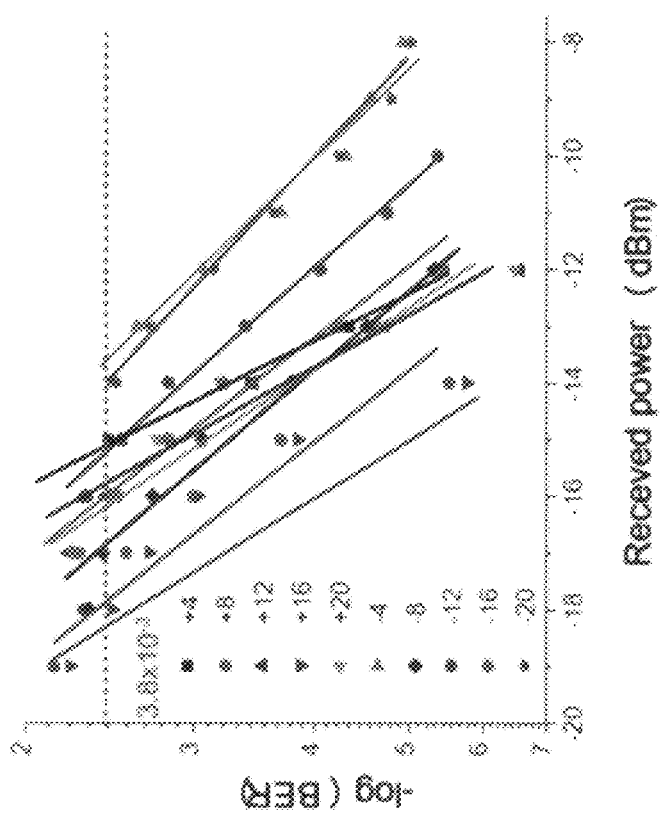
FIG. 6 is a graph that shows examples of Bit Error Rates (BER) versus received optical power of all 10 OAM modes.

FIG. 6 shows the BER versus received optical power of all 10 OAM modes that was recorded in experiments performed by the inventors. All the OAM modes in reflection path are −3 dB lower than the corresponding OAM mode with same topological charge value but opposite sign. Meanwhile, the OAM modes at two sides (4 and 20) are ~3 dB worse than that in the middle. Considering these two factors, OAM mode −4 and −20 both show the worst performance.

For OAM modes +12 which add the side mode from both +8 and +16, the power penalty is ~1.5 dB compared with +8 at same BER.

It will be appreciated that a passive optical network access architecture based on orbital angular momentum multiplexing is disclosed. In some disclosed embodiments, multiple data channels are multiplexed by orthogonal OAM modes on same wavelength to achieve efficient utilization of bandwidth resources. 10 OAM modes with each mode carrying 10 Gbit/s OOK signal, are transmitted over 0.7 m FSO link. The BER performances of all data channels can be under $3.8 \times 10^{-3}$ enhanced FEC limit. The experimental results show the potential of the disclosed architecture for providing user access with flexibility and bandwidth efficiency in next-generation passive optical network.

Figure 8:
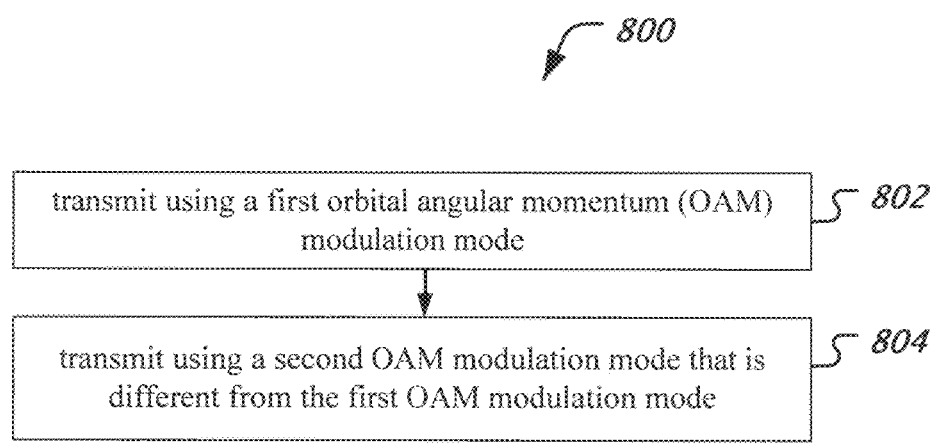
FIG. 8 is a flowchart representation of an example method of optical communication.

FIG. 8 depicts an example flowchart of a method 800 of optical communication. The method 800 may be implemented at an OLT (103 or 102) that is deployed on the network side of a passive optical access network (101 or 100).

At 802, the method 800 includes transmitting a first data portion to a first optical receiver using a first orbital angular momentum (OAM) modulation mode. In some embodiments, one of the OAM modes described with respect to FIG. 2 may be used. The first data portion may be, e.g., a portion of the network traffic, e.g., user data or control data, that is to be communicated from the OLT to an RN or an ONU.

At 804, the method 800 includes transmitting a second data portion, concurrently with transmitting the first data to the first optical receiver, to a second optical receiver using a second OAM modulation mode that is different from the first OAM modulation mode. In some embodiments, the concurrent transmission may be time domain multiplexed, i.e., although concurrency may be achieved in time by sharing successive time slots. The second data portion may be, e.g., a portion of the network traffic, e.g., user data or control data, that is to be communicated from the OLT to an RN or an ONU. The combination of first data portion and the second data portion may represent the line rate, or all data being transmitted, on the optical link 109.

As described herein, in some embodiments, the first and the second OAM modes may be selected from the ten modes depicted in FIG. 4. The selection of a mode to use may be based on operational conditions and availability of OAM modes on which there is lighter data load. In some embodiments, an OAM mode that shows the best BER performance at the time when a decision is made about which transmission mode to select, e.g., based on curves depicted in FIG. 6, may be selected by the transmitter. In some embodiments, a control channel communication between the transmitting node and the receiving node may be used by the transmitting node to keep an ongoing channel condition table in which the entries at the top of the table correspond to the OAM mode with best suitability for transmission (e.g., least BER).

In some embodiments, e.g., as previously disclosed with respect to FIG. 3, the method 800 may use a single light modulator, two beam splitters and three mirrors to generate 10 OAM modes on which data is modulated by generating a first hologram pattern having two additional OAM modes +4 and +12, generating a second hologram pattern two additional OAM modes +16 and +20, superimposing the generated hologram patters to obtain a light signal having five OAM modes +4, +8, +12, +16 and +20 and utilizing odd-time reflections of the five OAM modes to generate five additional OAM modes having an opposite charge sign, thereby resulting in generation of a light signal with ten OAM modes. The first and the second data portions may be modulated on a suitable one of the ten OAM modes.

Figure 9:
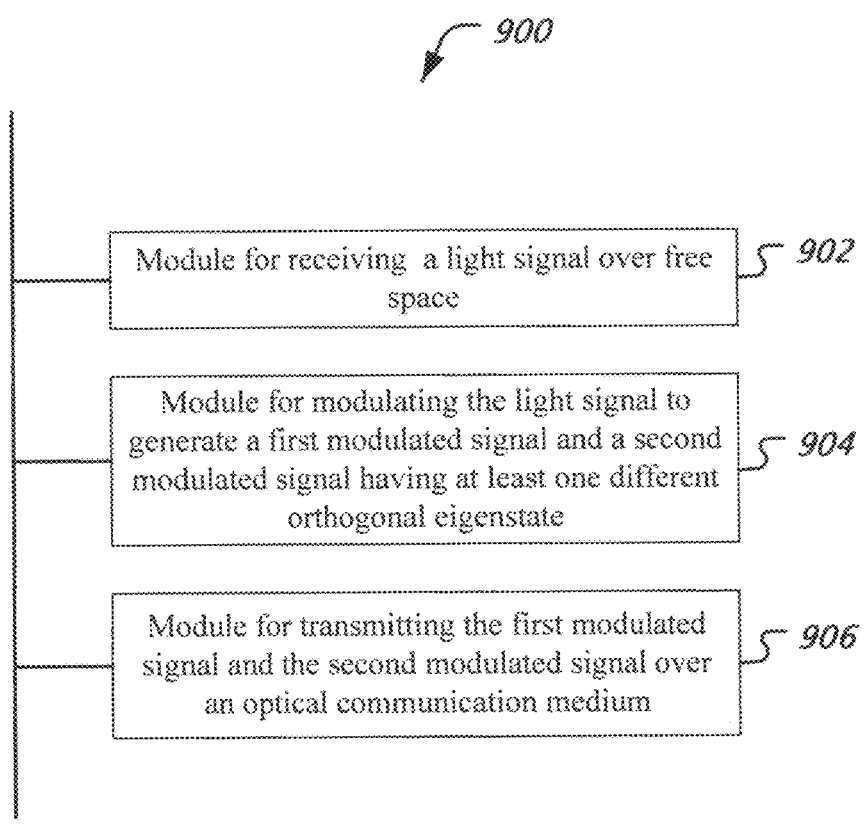
FIG. 9 depicts an example of an optical communication apparatus.

FIG. 9 depicts a block diagram of an example of an apparatus 900 for optical communication. The apparatus may be implemented at the network side, e.g., in an optical line terminal. The apparatus 900 may operator to receive light and generate OAM modulated signals therefrom.

The module 902 receives a light signal over free space. The module 902 may include, e.g., a light collector, a light detector, a light-to-electric signal converter, a signal amplifier, etc. The module 9802 may work together with a data reception module that receives data to be modulated on the outgoing signal.

The module 904 modulates the light signal to generate a first modulated signal having a first orbital angular momentum (OAM) modulation mode and a second modulated signal having a second OAM modulation mode which differs from the first OAM modulation mode in at least one orthogonal eigenstate of a component of the light signal. The first and second modulated signals may include first and second portions of data.

The module 906 to transmit the first modulated signal and the second modulated signal over an optical communication medium. In some embodiments, e.g., as discussed with respect to FIG. 3, the apparatus 900 may generate ten OAM modes using a single spatial light modulator, two beam splitters and three mirrors by generating a first hologram pattern having two additional OAM modes +4 and +12, generating a second hologram pattern two additional OAM modes +16 and +20, superimposing the generated hologram patters to obtain a light signal having five OAM modes +4, +8, +12, +16 and +20, utilizing odd-time reflections of the five OAM modes to generate five additional OAM modes having an opposite charge sign, thereby resulting in generation of a light signal with ten OAM modes.

In some embodiments, an optical communication system includes an optical transmitter apparatus, a first optical receiver and a second optical receiver. The optical transmitter apparatus receives information bits, modulates the information bits onto a light signal to generate a first modulated signal having a first orbital angular momentum (OAM) modulation mode and a second modulated signal having a second OAM modulation mode which differs from the first OAM modulation mode in at least one orthogonal eigenstate of a component of the light signal, and transmits the first modulated signal and the second modulated signal over an optical communication medium. The first optical receiver that receives the first modulated signal and recovers information bits from the first modulated signal. The second optical receiver that receives the second modulated signal and recovers information bits from the second modulated signal.

It will be appreciated that techniques for orbital angular momentum based multiplexing of optical communication signals are disclosed. Using the disclosed techniques, information bits to be transferred from the network to multiple optical receivers, e.g., optical network units deployed at user premises, may be multiplexed via signals having different OAM.

It will further be appreciated that the OAM based communication advantageously offers security of data transmission because without knowing the OAM mode, it is nearly impossible for receivers to receive signals meaningfully. Security may further be enhanced by changing the OAM mode used for data communication to a particular device on a periodic basis (e.g., once every 10 seconds).

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a network-side in an optical communication access network, comprising:
   transmitting a first data portion of an optical signal to a first optical receiver using a first orbital angular momentum (OAM) modulation mode; and
   transmitting a second data portion of the optical signal, concurrently with transmitting the first data portion to the first optical receiver, to a second optical receiver using a second OAM modulation mode that is different from the first OAM modulation mode,
   wherein the transmitted optical signal includes 10 OAM modes, generated by using a single light modulator, two beam splitters and three mirrors by:
   generating a first hologram pattern having two additional OAM modes +4 and +12;
   generating a second hologram pattern two additional OAM modes +16 and +20;
   superimposing the generated hologram patters to obtain a light signal having five OAM modes +4, +8, +12, +16 and +20;
   utilizing odd-time reflections of the five OAM modes to generate five additional OAM modes having an opposite charge sign, thereby resulting in generation of a light signal with ten OAM modes.

2. The method of claim 1, further including:
   providing the first optical receiver a priori information about the first OAM modulation mode; and
   providing the second optical receiver a priori information about the second OAM modulation mode.

3. The method of claim 2, wherein the a priori information is pre-configured in the first optical receiver and the second optical receiver.

4. The method of claim 1, wherein the transmitting the first data and the second data includes:
   operating a transmit chain comprising a free space optics link configured to multiplex the first data and the second data.

5. The method of claim 1, wherein the first OAM mode comprises a first set of one or more topological charge values of orbital momentum and wherein the second OAM mode comprises a second set of one or more charge values and wherein the first set and the second set differ in at least one topological charge value.

6. The method of claim 5, further including;
   changing the one or more topological charge values from the first set on a pre-determined periodic basis.

7. The method of claim 1, wherein the first data portion and the second data portion are modulated on at least some of the ten OAM modes.

8. A transmission apparatus operable at a network-side in an optical communication access network, comprising:
   a module to receive an optical signal over free space;
   a module to modulate the optical signal to generate a first modulated signal having a first orbital angular momentum (OAM) modulation mode and a second modulated signal having a second OAM modulation mode which differs from the first OAM modulation mode in at least one orthogonal eigenstate of a component of the light signal; and
   a module to transmit the first modulated signal and the second modulated signal over an optical communication medium,
   wherein the transmitted optical signal includes 10 OAM modes, generated by using a single spatial light modulator, two beam splitters and three mirrors by:
   generating a first hologram pattern having two additional OAM modes +4 and +12;
   generating a second hologram pattern two additional OAM modes +16 and +20;
   superimposing the generated hologram patters to obtain a light signal having five OAM modes +4, +8, +12, +16 and +20;
   utilizing odd-time reflections of the five OAM modes to generate five additional OAM modes having an opposite charge sign, thereby resulting in generation of a light signal with ten OAM modes.

9. The apparatus of claim 8, further including:
   a module that transmits, over the optical communication medium, information about the first OAM modulation mode prior to commencing use of the first OAM modulation mode; and
   a module that transmits, over the optical communication medium, information about the second OAM modulation mode prior to commencing use of the second OAM modulation mode.

10. The apparatus of claim 8, wherein the optical communication medium comprises at least one of a free space or a vortex fiber medium.

11. The apparatus of claim 8, wherein the module to modulate the light signal comprises a transmit chain that multiplexes the first modulated signal and the second modulated signal.

12. The apparatus of claim 8, wherein the first OAM modulation mode comprises a first set of one or more topological charge values of orbital momentum and wherein the second OAM modulation mode comprises a second set of one or more charge values and wherein the first set and the second set differ in at least one topological charge value.

13. The apparatus of claim 12, further including;
a module that changes the one or more topological charge values from the first set on a pre-determined periodic basis.

14. The apparatus of claim 8, wherein the first data portion and the second data portion are modulated on at least some of the ten OAM modes.

15. An optical communication system comprising:
an optical transmitter that:
receives information bits;
modulates the information bits onto a light signal to generate a first modulated signal having a first orbital angular momentum (OAM) modulation mode and a second modulated signal having a second OAM modulation mode which differs from the first OAM modulation mode in at least one orthogonal eigenstate of a component of the light signal; and
transmits the first modulated signal and the second modulated signal over an optical communication medium;
a first optical receiver that receives the first modulated signal and recovers information bits from the first modulated signal; and
a second optical receiver that receives the second modulated signal and recovers information bits from the second modulated signal;
wherein the transmitted light signal includes:
a first data pattern generated using a first rotational symmetry angular mask, and
a second data pattern generated using a second rotational symmetry angular mask, wherein the second data pattern is superimposed onto the first data pattern.

16. The system of claim 15, wherein the optical communication medium comprises a vortex fiber medium.

17. The system of claim 15, wherein the first optical receiver is pre-configured with information about the first OAM modulation mode and the second optical receiver is pre-configured with information about the second OAM modulation mode.

18. A method of optical communication, implemented at a network-side in an optical communication access network, comprising:
transmitting a first data portion of an optical signal to a first optical receiver using a first orbital angular momentum (OAM) modulation mode; and
transmitting a second data portion of the optical signal, concurrently with transmitting the first data portion to the first optical receiver, to a second optical receiver using a second OAM modulation mode that is different from the first OAM modulation mode,
wherein the transmitted optical signal includes:
a first set of data modes generated using a first angular mask, and
a second set of data modes generated using a second angular mask, wherein the second set of data modes is superimposed onto the first set of data modes.

19. The method of claim 18, wherein the transmitted optical signal further includes:
a third set of data modes generated based on the first and second set of data modes using reflection.

20. The method of claim 18, further including:
providing the first optical receiver a priori information about the first OAM modulation mode; and
providing the second optical receiver a priori information about the second OAM modulation mode.

21. The method of claim 20, wherein the a priori information is pre-configured in the first optical receiver and the second optical receiver.

22. The method of claim 18, wherein the transmitting the first data and the second data includes:
operating a transmit chain comprising a free space optics link configured to multiplex the first data and the second data.

23. The method of claim 22, wherein the first OAM mode comprises a first set of one or more topological charge values of orbital momentum and wherein the second OAM mode comprises a second set of one or more charge values and wherein the first set and the second set differ in at least one topological charge value.

24. The method of claim 23, further including;
changing the one or more topological charge values from the first set on a pre-determined periodic basis.

25. A transmission apparatus operable at a network-side in an optical communication access network, comprising:
a module to receive an optical signal over free space;
a module to modulate the optical signal to generate a first modulated signal having a first orbital angular momentum (OAM) modulation mode and a second modulated signal having a second OAM modulation mode which differs from the first OAM modulation mode in at least one orthogonal eigenstate of a component of the light signal; and
a module to transmit the first modulated signal and the second modulated signal over an optical communication medium,
wherein the transmitted optical signal includes:
a first set of data modes generated using a first rotational symmetry angular mask, and
a second set of data modes generated using a second rotational symmetry angular mask, wherein the second set of data modes is superimposed onto the first set of data modes.

26. The apparatus of claim 25, wherein the transmitted optical signal further includes:
a third set of data modes generated based on the first and second set of data modes using reflection.

27. The apparatus of claim 25, further including:
a module that transmits, over the optical communication medium, information about the first OAM modulation mode prior to commencing use of the first OAM modulation mode; and
a module that transmits, over the optical communication medium, information about the second OAM modulation mode prior to commencing use of the second OAM modulation mode.

28. The apparatus of claim 25, wherein the optical communication medium comprises at least one of a free space or a vortex fiber medium.

29. The apparatus of claim 25, wherein the module to modulate the light signal comprises a transmit chain that multiplexes the first modulated signal and the second modulated signal.

30. The apparatus of claim 25, wherein the first OAM modulation mode comprises a first set of one or more topological charge values of orbital momentum and wherein the second OAM modulation mode comprises a second set of one or more charge values and wherein the first set and the second set differ in at least one topological charge value.

31. The apparatus of claim 30, further including;
a module that changes the one or more topological charge values from the first set on a pre-determined periodic basis.

\* \* \* \* \*